June 1, 1965  R. D. CRAIG ETAL  3,187,237
PERMANENT MAGNET ASSEMBLY
Filed April 30, 1962
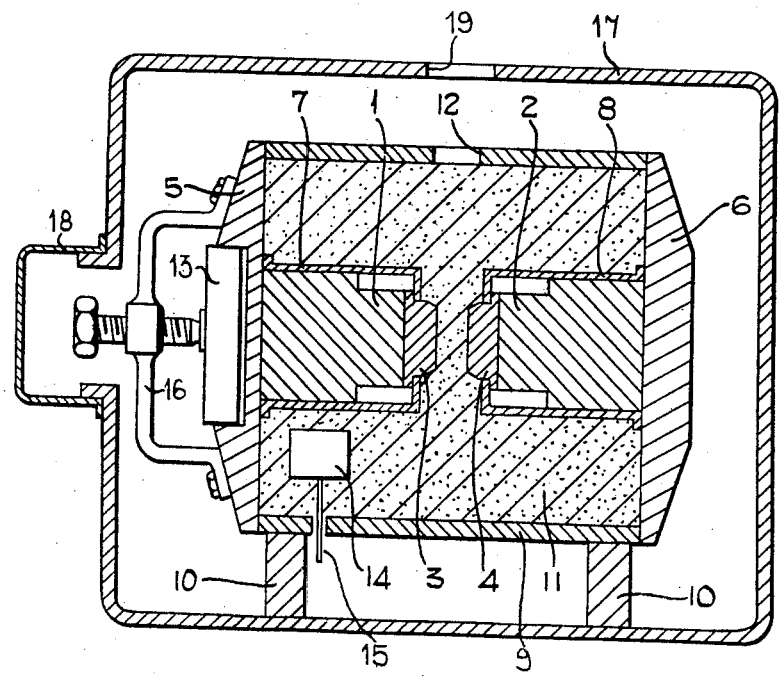
INVENTORS
ROBERT DEREK CRAIG
JOHN LEWIS WILLIAMS
EDWARD WILLDIG
By: Morris & Bateman
attys

United States Patent Office 3,187,237
Patented June 1, 1965

3,187,237
PERMANENT MAGNET ASSEMBLY
Robert Derek Craig, Bowdon, John Lewis Williams, Wilmslow, and Edward Willdig, Stretford, England, assignors to Associated Electrical Industries Limited, London, England, a British company
Filed Apr. 30, 1962, Ser. No. 191,130
Claims priority, application Great Britain, May 2, 1961, 15,883/61
5 Claims. (Cl. 317—158)

The present invention relates to magnet assemblies and in particular to magnet assemblies which produce a steady, high intensity homogeneous magnetic field which can be used, for example, in magnetic resonance spectrometers.

In such spectrometers it is necessary to have a magnet assembly which produces a high intensity magnetic field. The specimen under analysis is inserted into this field and associated apparatus which is sensitive to the gyromagnetic resonance of either the nuclei or the electrons of the specimen is used to analyze the specimen in a well known manner. The field produced by the magnet assembly must be homogeneous and steady, at least over the central portion of its extent, and must be substantially unaffected by ambient temperature changes or by stray magnetic fields.

The object of the present invention is to provide a magnet assembly which produces a magnetic field tending to satisfy the above requirements.

According to the present invention a magnet assembly comprises two permanent magnets extending axially towards each other and separated by a gap in which is produced a high intensity magnetic field together with a cylindrical yoke of a good thermally conducting material connecting said magnets and extending coaxially around said magnets.

The yoke may be formed with an aperture through which an object may be passed into the field produced between the two magnets.

According to a preferred embodiment of the invention the yoke comprises a movable member which may be moved in order to change the reluctance of the magnet circuit.

The adjacent surfaces of the magnets forming the gap may be flat and parallel or suitably shaped to ensure that the magnetic field is homogeneous over its central region by reducing the radial variation of the field strength due to edge effects.

In order that the invention may be more readily understood reference will now be made to the accompanying drawing in which the single figure is a side view, sectioned on an axial plane, of a magnet assembly embodying the invention.

With reference to this figure the magnet assembly comprises two powerful permanent magnets 1, 2 having pole pieces 3, 4 respectively. These two magnets each of which may comprise a number of discs, extend axially towards each other so that the pole pieces are separated by a small gap which may be filled by a non-magnetic spacer. The magnets are mounted on two end plates 5, 6 of high permeability material by clamps 7, 8 of non-magnetic material and the two end plates are connected by a cylindrical member 9 of material of high permeability and good thermal conductivity.

The yoke of the magnet assembly is formed by the cylindrical member 9 in combination with the end plates 5, 6 and hence completely surrounds the magnets 1, 2 and the high intensity field produced in the gap between them, and extends coaxially with the two magnets. The yoke screens the magnets from any external stray fields and ensures the good distribution of heat throughout the assembly. The yoke may be lagged internally and externally and mounted on thermally insulating supports 10. The space 11 within the yoke may be filled with a thermally insulating material such as polystyrene foam.

The yoke is formed with an aperture 12 through which objects may be passed into the gap between the pole pieces 3, 4. This aperture is utilized when the magnet assembly is used in a magnetic resonance spectrometer as described above.

The end plate 5 includes a slug 13 of high permeability material which may be moved relative to the end plate by suitable means, such as a screw jack mechanism 16. The movement of the slug 13 alters the reluctance of the magnetic circuit of the yoke and enables the strength of the field between the pole pieces to be varied. The surfaces of the pole pieces 3, 4 defining the gap are essentially parallel, but may be suitably shaped to counteract edge effects which produce a radial variation of field strength over the central region when a very intense field is produced between the magnets 1, 2. In order to increase the maximum field strength obtainable each magnet is tapered towards its associated pole piece, as illustrated.

It will be seen that with such a magnet assembly, the chances of the magnetic field provided by the magnets 1, 2 between the pole pieces 3, 4 being affected by stray external fields or changes in temperature are very considerably reduced. The yoke substantially screens the space 11 magnetically and the good thermal conductivity of the material of the yoke ensures that any increase in temperature takes place evenly throughout the whole assembly, and hence there is substantially no distortion of the assembly which would affect the homogeneity of the field.

When the magnet assembly is used in a magnetic resonance spectrometer a crystal oscillator is sometimes used in the associated equipment. The frequency of such an oscillator will depend on the temperature of the crystal, and the field strength of the magnet assembly will also depend on the temperature of the assembly. It is essential that the frequency and the field strength should be constant relative to one another, whereas both can vary with temperature. Therefore, in accordance with a preferred arrangement, the crystal for the oscillator is located in a container 14 within the yoke of the magnet assembly and leads 15 connect the crystal with the associated equipment. The temperature stability of both the crystal and the magnet assembly will then be the same and any additional means used to stabilize the temperature of the magnet assembly will simultaneously stabilize the temperature of the crystal in the container 14.

In order to screen the magnets from stray magnetic fields even more efficiently the magnet assembly described may be enclosed in a container 17. This container is made from material of high magnetic permeability and has an end plate 18 providing access to the slug 13 and an aperture 19 providing access to the aperture 12 and the gap between the magnet poles. The magnet assembly is supported from the container on the thermally insulating supports 10.

What we claim is:
1. A magnet assembly comprising two magnets extending axially towards each other with their adjacent ends defining a gap in which is produced a high intensity magnetic field, and means providing a screen against external magnetic fields and protection against ambient temperature variations comprising a cylindrical yoke of a good thermally conducting high permeability material connecting said magnets and extending co-axially around said magnets.

2. A magnet assembly comprising two magnets extending axially towards each other with their adjacent ends defining a gap in which is produced a high intensity magnetic field, means providing a screen against external magnetic fields and protection against ambient temperature variations comprising a cylindrical yoke of a good thermally conducting high permeability material connecting said magnets and extending co-axially around said magnets, and a container of a material of a high magnetic permeability surrounding said yoke and thermally insulated therefrom.

3. A magnet assembly comprising two magnets extending axially towards each other with their adjacent ends defining a gap in which is produced a high intensity magnetic field, said adjacent ends being suitably shaped so as to counteract edge effects which tend to produce a radial variation of the field strength within the gap, means providing a screen against external magnetic fields and protection against ambient temperature variations comprising a cylindrical yoke of a good thermally conducting high permeability material connecting said magnets and extending co-axially around said magnets, and thermal insulating means surrounding said magnets and enclosed by said yoke.

4. A magnet assembly comprising two magnets extending axially towards each other with their adjacent ends defining a gap in which is produced a high intensity magnetic field, means providing a screen against external magnetic fields and protection against ambient temperature variations comprising a cylindrical yoke of a good thermally conducting high permeability material connecting said magnets and extending co-axially around said magnets, a movable portion to said yoke, and means for moving said movable portion so as to vary the reluctance of the magnetic circuit of the yoke.

5. A magnet assembly comprising two magnets extending axially toward each other with their adjacent ends defining a gap in which is produced a high intensity magnetic field, a yoke assembly comprising opposite end members on which said magnets are mounted and a cylindrical member extending between said end members in surrounding relation to said magnets, said yoke members all being of high magnetic permeability and co-acting to substantially completely shieldingly enclose said magnets, and said cylindrical members being of good thermal conductivity for even distribution of temperature in the assembly.

References Cited by the Examiner
UNITED STATES PATENTS

| | | | |
|---|---|---|---|
| 3,018,422 | 1/62 | Seaton | 317—158 |
| 3,030,556 | 4/62 | Watson | 317—158 |
| 3,056,070 | 9/62 | Nelson | 317—158 |

JOHN F. BURNS, *Primary Examiner.*

E. JAMES SAX, *Examiner.*